United States Patent [19]

Lange et al.

[11] 3,954,945

[45] May 4, 1976

[54] PROCESS FOR THE PRODUCTION OF FINELY DIVIDED OXIDES

[75] Inventors: Ludwig Lange; Jean Diether; Axel Völling; Hans Klebe, all of Rheinfelden, Germany

[73] Assignee: Deutsche Gold- und Silber-Scheideanstalt vormals Roessler, Frankfurt am Main, Germany

[22] Filed: Oct. 27, 1972

[21] Appl. No.: 301,390

[30] Foreign Application Priority Data

Oct. 28, 1971 Germany............................ 2153671

[52] U.S. Cl................................ 423/336; 423/337; 423/592; 423/608; 423/612; 423/613; 423/625; 423/632; 423/633
[51] Int. Cl.$^2$...................... C01B 33/12; C01F 7/02; C01G 49/02; C01G 23/06
[58] Field of Search ........... 423/336, 337, 592, 608, 423/612, 613, 632, 633

[56] References Cited
UNITED STATES PATENTS

| | | | |
|---|---|---|---|
| 2,990,249 | 6/1961 | Wagner................................ | 423/336 |
| 3,468,689 | 9/1969 | Lott, Jr. et al.................. | 423/613 X |
| 3,567,478 | 3/1971 | Dietz et al. ...................... | 423/613 X |

Primary Examiner—Edward Stern
Attorney, Agent, or Firm—Beveridge, DeGrandi, Kline & Lunsford

[57] ABSTRACT

Process for the production of a finely divided oxide of a metal or silicon by the hydrolytic conversion of a volatile corresponding metal halide or silicon halide in a flame, said process comprising feeding the volatile halide in a mixture with a combustible hydrogen-containing gas and air or oxygen to a burner provided with a mouth emitting a flame, burning the mixture in a fire tube to form a first portion of water vapor, said burner surrounded by an annular chamber forming a nozzle through which hydrogen is passed to keep the mouth of the burner free of attachments of solid substances, the quantity of oxygen or air being sufficient for the practically complete combustion of the combustible gas, and the quantities of oxygen or air and combustible gas being sufficient to produce the first portion of water vapor which will at least suffice for the hydrolysis of the volatile halides, and further wherein said flame is allowed to burn in an atmosphere consisting of gases containing a second portion of water vapor, to avoid the formation of halogen gas in waste gases and separating the resulting oxide from other reaction products. The finely divided oxides are useful as additives and fillers in the manufacture of coatings, adhesives and elastomers.

12 Claims, 3 Drawing Figures

PROCESS FOR THE PRODUCTION OF FINELY DIVIDED OXIDES

This invention relates to a process for the production of very finely divided oxides of metals or silicon by the hydrolytic conversion of a volatile corresponding metal halide or silicon halide in a flame.

It is known in the art that very finely divided oxides can be produced by the hydrolytic conversion of a volatile metal halide. The volatile halide is mixed with a combustible gas and air or oxygen. The resulting mixture is then fed to a burner where combustion takes place. In the alternative, the volatile halide, combustible gas, and air or oxygen can be fed separately to the burner. The combustible gas contains hydrogen, and the air or oxygen are mixed with the combustible gas in such a ratio that the hydrogen will be almost completely burned, and a quantity of water vapor formed which will at least suffice for the hydrolysis of the volatile halide. For the production of particularly active products, the temperature of the flame is conveniently controlled by the addition of hyperstoichiometric quantities of air or oxygen or of an inert gas, such as nitrogen.

The products obtained according to these known processes are generally obtained together with a waste gas containing a hydrogen halide gas. The product, in the form of oxide particles, can be isolated from the hydrogen halide gas in a separator.

When chlorides, such as silicon tetrachloride, are used as the volatile halide, the hydrolysis or pyrolysis does not take place entirely in accordance with the following equation

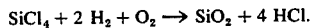

$$SiCl_4 + 2 H_2 + O_2 \rightarrow SiO_2 + 4 HCl.$$

When the process is carried out using a stoichiometric excess of oxygen, the waste gas from the burner contains 6–10% by weight free chlorine related to the portion of hydrogen chloride. The chlorine obtained as a byproduct must generally be removed from the waste gas. This can be accomplished by using conventional techniques, but it requires an additional capital expenditure after the absorption of the hydrogen chloride from the waste gas.

Because such processes are expensive, attempts have already been made to control the formation of chlorine during the pyrolytic conversion. For example, German Patent No. 1,210,421 teaches that the formation of free chlorine can be avoided by not carrying out the pyrolysis in the presence of secondary air, but rather in the presence of an inert gas such as nitrogen. This reference discloses a process which operates with a so-called self-sufficient flame, i.e., the flame contains a homogeneous distribution of all components necessary for the reaction. Furthermore, German Patent No. 1,244,125 discloses an extension of the previously mentioned process. This reference teaches that a portion of the waste gas obtained after separation of solid matter can be introduced by doses into a closed combustion chamber instead of employing the so-called secondary air.

By practicing the processes of the prior art, it is true that the formation of free chlorine can largely be prevented. However, conversion can only be carried out by burning the flame in an atmosphere of inert gas, or in a closed combustion chamber.

Thus, there has been a need in the art for a relatively simple and inexpensive process for the production of finely divided oxides of metals and oxides of silicon. In practicing the process, the formation of free halogen, such as chlorine, should practically be eliminated. The process should be one which does not require the additional step of removing a halogen by-product from the waste gas.

Accordingly, this invention provides a process for the production of finely divided oxides of metals or silicon by the hydrolytic conversion of a volatile corresponding metal halide or silicon halide in a flame whereby the formation of free halogen is avoided. The process comprises feeding the volatile halide in a mixture with a combustible hydrogen-containing gas and air or oxygen to a burner provided with a mouth emitting a flame. The mixture is burned in a fire tube whereby a first portion of water vapor is formed. The burner is surrounded by an annular chamber forming a nozzle through which hydrogen is passed to keep the mouth of the burner free of attachment of solid substances. The quantity of oxygen or air is sufficient for the practically complete combustion of the combustible gas. Further, the quantities of oxygen or air and combustible gas are sufficient to produce the first portion of water vapor which will at least suffice for the hydrolysis of the volatile halide. The flame is allowed to burn in an atmosphere consisting of gases containing a second portion of water vapor to avoid the formation of free halogen in waste gases and the resulting metal oxides and/or silicon oxides are separated from other reaction products (waste gases).

This invention will be more fully understood by reference to the appended figures in which.

The characterizing part of this invention is to be seen in the fact that the flame is allowed to burn in an atmosphere consisting of gases containing a second portion of water vapor. In the embodiment of this invention, the flame is surrounded with a jacket of gases containing the second portion of water vapor.

Figure 3:
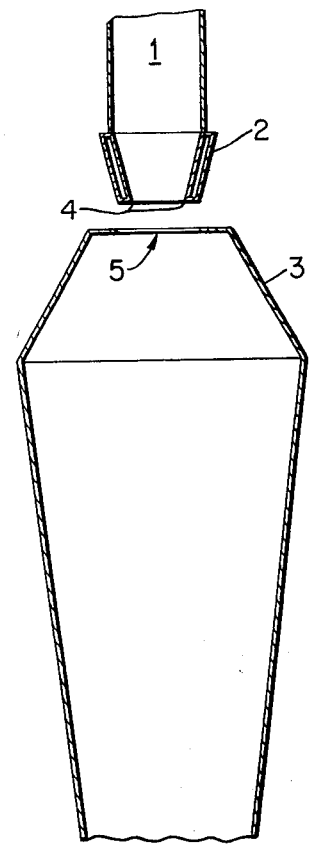
FIG. 3 is a view in cross-section of a burner and fire tube.

Referring to FIG. 3, a burner 1 is provided with an annular chamber 2 forming a nozzle 4 at the opening of the burner. Separated from the chamber 2 and burner 1 is a fire tube 3 having an opening 5 near the burner and annular chamber. In FIG. 3, the longitudinal axes of the burner 1 and fire tube 3 are seen to be practically coincident. In a preferred embodiment of this invention, the annular chamber 2 surrounds a flame (not shown in FIG. 3) emitted by the burner 1. A jacket of water forming gases is passed through the annular chamber 2 surrounding the flame. The annular chamber 2 need not be a single continuous passage surrounding the burner 1.

In a preferred embodiment, superheated steam is fed, for example, through a jet ring (i.e. a ring containing openings forming jets), preferably made of a noble metal, disposed in the upper part of the fire tube. Silver is a preferred noble metal. A protective AgCl film prevents corrosion of the jet ring, and thus prevents the creation of additional impurities in the oxide aerosol. Preferably, the necessary quantity of steam is heated to about 250° C just prior to the passage through the jet. This embodiment of the invention will be more clearly understood by reference to FIG. 2. A burner 1 is provided with an annular chamber 2 as in FIG. 1. Fire tube 3 has centrally disposed therein a jet ring 6. The jet ring 6 is comprised of a plurality of jets or nozzles through which the steam is discharged into the fire tube 3. The size and number of nozzles in the jet ring is generally not a critical aspect of this invention. Rather, construction of the ring will be apparent to those skilled in the art.

In practicing the process of this invention, the additional steam (i.e. second portion of water vapor) in which the reaction flame is to burn need not be fed from an external source. Rather, it has been found that the additional steam can also be produced by burning additional hydrogen with secondary air in the flame emitted by the chamber 2. In this case, "secondary air" means air that is added at locations lying between the mouth of the burner and the lower part of the flame. The secondary air can be added in a direction parallel to, perpendicular to or at an acute or obtuse angle to the direction of flow of the flame (see FIG. 1). Also, depending upon the design of the conversion apparatus, the secondary air can flow in from the outside. The latter case occurs for example, when a device is used in which the mouth of the burner and the inlet of the fire tube are located at a distance from one another, and therefore the gaseous reaction mixture emitted by the burner will pass a free air space prior to its entry into the fire tube. The inflow of the secondary air into the fire tube can be effected or furthered by suction of the gases of the flame and/or by applying a vacuum or reduced pressure in the fire tube.

According to a preferred embodiment of this invention, the fire tube is provided with an opening spaced apart from the mouth of the burner, and the additional water vapor or additional hydrogen is added to the process within this space. It will of course be understood that the steam or the additional hydrogen can also be added inside the fire tube. It has been found that this procedure is advantageously employed since it permits operation which is practically free of breakdowns. In this case, the steam or the additional hydrogen is conveniently fed into the upper part of the fire tube by means of jets disposed in the fire tube. It will be understood that the jet arrangement in the fire tube can vary. For example, a ring can be provided with nozzles or gas exit openings shaped as desired, or an annular gap in the fire tube can be used.

A further variation of this invention involves the introduction of additional hydrogen to the process by way of the annular chamber surrounding the burner in order to keep the mouth of the burner open.

The quantity of secondary air which is used to burn the additional hydrogen, can be added to the process and regulated by means apparent to those skilled in the art. In the present invention, the use of a fire tube which can be contricted at its upper end by way of a diaphragm (seen in FIG. 2 as No. 9) has been found to be advantageous. Other means of constricting the opening of the fire tube at its upper end can also be employed, and will be apparent to the art skilled.

A change in the temperature of the flame can conveniently be achieved by adding an inert gas, preferably nitrogen, to a mixture of the combustible gas and air or oxygen. This technique is well known in the art.

Figure 1:
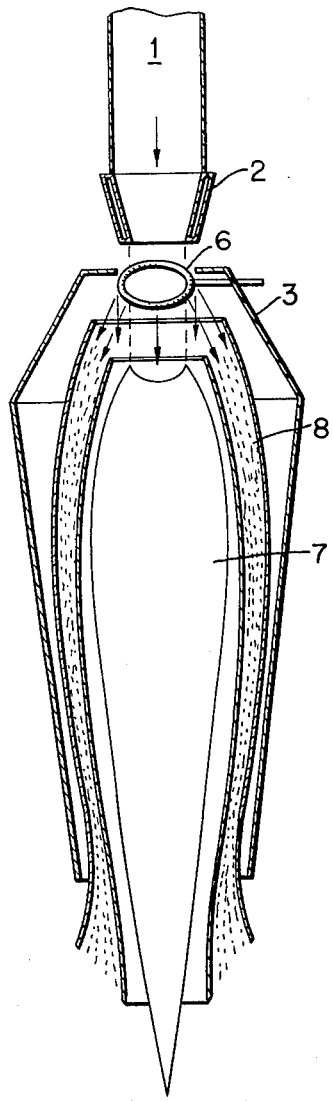
FIG. 1 is a cross-sectional view of a burner and fire tube containing a jet ring and detonating gas flame as well as a steam jacket.
Figure 2:
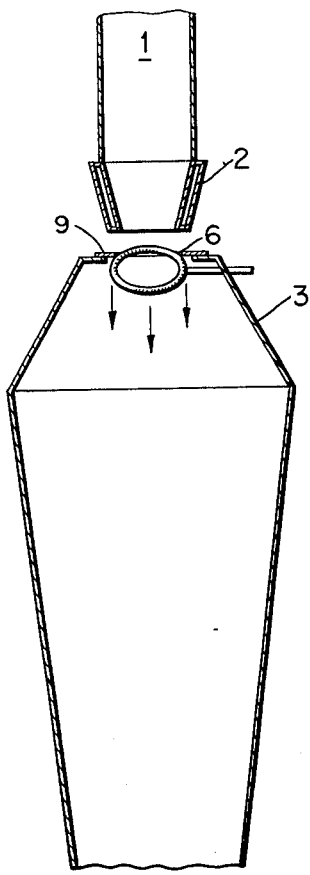
FIG. 2 is a cross-sectional view of a burner and fire tube fitted with a jet ring.

Referring to FIG. 1, a burner 1 is provided with an annular chamber 2. A fire tube 3 is spaced apart from the burner 1. The fire tube 3 is provided with a jet ring 6 through which steam or hydrogen can be introduced into the fire tube 3. For the purpose of illustration, FIG. 1 shows a detonating gas flame (aerosol flame) 7 as well as a steam jacket 8.

This invention will be more clearly understood by reference to the following examples. All parts, proportions percentages and ratios are by weight unless otherwise specified.

EXAMPLE 1

Referring to FIGS. 1 and 3, a jet ring 6 is installed in the opening 5 of fire tube 3 in such a way that the opening of the fire tube lies approximately 10 – 15 mm above the annular plane of the ring. Nozzle openings are provided in the jet ring in such a way that the emerging steam (i.e. second portion of water vapor) will surround the aerosol flame 7 like a mantel (e.g., in the shape of a cylinder). As material for the jet ring 6, silver is preferred. A protective AgCl film prevents corrosion of the jet ring, and also prevents additional contamination of the oxide aerosol. In order to avoid condensation, and with it an excessive consumption of steam, the steam emerging from the jet ring is superheated by a heater to about 250° C prior to its entering the jet ring. The opening of the fire tube 3 is made smaller by means of a diaphragm 9 (shown as 9 in FIG. 2) in order to keep the quantity of secondary air sucked in as small as possible.

For the production of finely divided $SiO_2$, every hour 436 moles $SiCl_4$, 25 $Nm^3/h$ [$Nm^3$ = standard cubic meter/hr] hydrogen (1120 moles /h), and 60 $Nm^3/h$ air (560 moles/h oxygen) are introduced into the burner. As a jacket gas, 0.7 $Nm^3/h$ hydrogen are passed through the annular chamber 2. About 20 kg/h water vapor (i.e. the second portion of water vapor) are fed through the jet ring 6 after firing and loading of the burner 1. The flame 7 burns at a temperature of about 1200° C, and produces per hour 26.5 kg $SiO_2$ having a surface area of about 200 $m^2/g$ BET. (BET method = Brunauer/Emmett/Teller method for the determination of the absolute size of a surface with due consideration to unevennesses). The concentration of free chlorine in the waste gas after an aerosol separator is less than 0.1% by weight related to the hydrogen chloride portion, while in the case of the standard production method 6 to 10% by weight can be found in the waste gas after a separator for solid substances.

EXAMPLE 2

In the case of this variation (FIG. 3), the jet ring 6 can be omitted. The previous quantity of "jacket" hydrogen is increased. In so doing, a jacket of water vapor (i.e. the second portion of water vapor) is produced around the flame by burning the additional hydrogen with sucked in secondary air (e.g. from the opening between 1 and 3). The jacket is necessary to prevent formation of free chlorine in the flame. In the case of this method of operation too, the opening of the fire tube is kept as small as possible by means of a diaphragm, such as 9 in FIG. 2. In this case, the following conditions are selected: 436 moles/h $SiCl_4$, 25 $Nm^3/h$ (1120 moles/h) hydrogen, and 60 $Nm^3/h$ air (560 moles/h oxygen) are fed to the burner. The quantity of jacket hydrogen is increased from 0.7 $Nm^3/h$ (in Example 1) to 3.5 $Nm^3/h$. The 3.5 $Nm^3/h$ hydrogen are additionally diluted with about 1.5 Nm³/h of an inert gas, so that the annular space around the burner, i.e. the annular chamber 2, is provided with a total of 5 Nm³/h of a gas capable of forming water vapor when burned with oxygen. In order to obtain the same temperature or the same surface area as in Example 1 ( 200 m²/g), there is also fed to the burner 10 Nm³/h (446 moles/h) N₂. It is surprising that the product produced according to this method has a thickening effect which is higher by about 20% than oxides produced by prior art methods and having a specific surface of 200 m²/g.

It will be possible to produce types of oxides with varied surfaces by addition of inert gas into the reaction gas mixture instead of the excess air.

The analytically determined concentration of oxygen in the waste gas of the burner in the case of all experiments was between 5 and 7 volume %. A quantity of hydrogen in the reaction mixture, optionally in a stoichiometric excess, will still be burned in the fire tube, and does not reach the following units of the apparatus.

The following conditions are employed in the case of the prior conveniently method of operation: 436 moles/h SiCl₄, 25 Nm³/h (1120 moles/h) hydrogen and 62 Nm³/h air (579 moles/h) oxygen are needed to obtain a highly dispersed oxide with a surface of about 200 m²/g. Approximately 0.7 Nm³/h hydrogen is added as a jacket gas. In this case 6 to 10% by weight chlorine are in the waste gas behind the aerosol separator.

The finely divided oxides are useful as additives and fillers in the manufacture of coatings, adhesives and elastomers. The finely divided silicon dioxide having a large surface area produced according to the process of this invention is particularly suitable for the following applications:

Increase of vicosity and thixotropy of organic media, especially unsaturated polyester lacquers, strengthening of hot vulcanizing transparent silicon rubber, the latter especially in the form of the product hydrophobed according to processes known in the art. Other uses will be apparent to those skilled in the art.

The process of this invention can be used to prepare very finely divided oxides of metals or silicon. The particle size of the oxides is not critical to the successful operation of this invention. The specific surface of the oxides is also not critical, but will generally be at least about 200 m²/g BET.

Although it is preferred to utilize the process of this invention in preparing oxides of silicon, such as finely divided SiO₂, it can also be utilized in the preparation of oxides of metals generally. The process can be effectively employed for preparing oxides of metals or silicon from their corresponding metal halides or silicon halides. The metal chlorides are preferred. Silicon tetrachloride and trichlorsilane are particularly preferred. The halide used in practicing the process of this invention is volatile, that is, it is a compound which can readily be converted into a gas or vapor at the process temperature.

Fluorine, bromine and iodine compounds can also be used as the metal halide or silicon halide, although chlorides are preferred. It will be understood that halide mixtures can be used, and oxide mixtures can be prepared.

Metal oxides which can be prepared from corresponding metal halides by hydrolytic conversion are well known in the art. Typical of these metal oxides are TiO₂, Al₂O₃, ZrO₂, Fe₂O₃, etc.

It will be apparent from the foregoing description that the process of this invention involves both pyrolytic and hydrolytic chemical reactions.

A hydrogen-containing gas is also employed in practicing the process of this invention. The essential ingredient of this gas is hydrogen which is reacted with oxygen or air to form water. It will be apparent to those skilled in the art that other components of this gas, and the amounts of such components, are not critical provided they do not materially detract from the operation of the process of this invention. Thus, the term "combustible hydrogen-containing gas" is intended to mean a combustible gas which contains hydrogen as an essential ingredient, either as free hydrogen or in compound form with other elements (e.g. methane), which gas is capable of forming water vapor upon combustion. Other components can be present which do not materially detract from the basic and novel characteristics of the process disclosed herein.

Oxygen gas or air is reacted with the combustible hydrogen-containing gas to form water. It will be apparent to those skilled in the art that a mixture of oxygen gas and air, e.g. oxygen-enriched air, can be used in practicing this invention. The quantity of oxygen or air used must be sufficient to practically completely react with all of the hydrogen in the combustible hydrogen-containing gas. Furthermore, the quantities of oxygen or air and combustible gas must be sufficient to produce a quantity of water which will at least suffice for the hydroysis of the volatile silicon halide. It will be understood that the quantity of these gases can be such that an excess of water will be produced upon reaction. It is also to be understood that any and all quantities of oxygen, air and combustible hydrogen-containing gas which produce the aforementioned results under the other process conditions are intended to be within the scope of this invention.

The relative amounts and flow rates of the oxygen gas, air and combustible hydrogen-containing gas can be readily determined by one skilled in the art. For example, knowing the flow rate of the volatile halide, and its rate of hydrolysis in water at the process operating temperature and pressure, one skilled in the art can readily determine the amount of water which must be produced to hydrolyze the halide. Knowing the amount of water which must be produced, one can determine the amount of oxygen gas, air and hydrogen-containing gas which must be reacted to produce this amount of water.

In practicing the process of this invention, the combustible gas and oxygen are burned in a flame. The flame temperature and speed are generally not critical in practicing this invention. The pressure at which the process of this invention is operated will be readily apparent to one skilled in the art.

The gases produced upon combustion of the reactants contain highly dispersed silicic acid as an aerogel. The hot gases can then be passed through a furnance and cooling zone of the type well known in the art. See for example U.S. Pat. No. 2,990,249.

After the silicic acid is coagulated by known methods, it can be separated from the combustion gases by means well known in the art. For example, gravity settlers, cyclone separators, such as centrifugal separators, impingement separators, electrostatic separators, and separators which employ accoustical energy can be used. The techniques of phase separation are well known to those skilled in the art. See, for example, John H. Perry, "Chemical Engineer's Handbook", Fourth Edition, McGraw-Hill, Inc., N.Y. (1963) pp. 18-82 through 18-88.

In a preferred embodiment of this invention, the flame has a temperature which is regulated by the addition of an inert gas to the reaction mixture consisting of the volatile halide, combustible gas, and air or oxygen. By an "inert gas" is meant any gas which itself does not enter into the pyrolysis of hydrolysis reactions, or one which does not materially interfere with the basic and novel aspects of the process as disclosed. Preferably, the inert gas is nitrogen, a noble gas, or mixture of the gases.

Equipment for conducting the combustion reaction in the flame is well known in the art; see, for example, U.S. Pat. No. 2,990,249. It will of course be recognized that the reaction time in the flame is of extremely short duration because of the nature of the process.

The flow rate of the hydrogen through the chamber forming the nozzle around the burner is sufficient to keep the mouth of the burner free of attachments of solid substances and to avoid the formation of halogen gas in waste gases. Any and all amounts of hydrogen which accomplish these results are intended to be within the scope of this invention. The amount of the "second portion" of water vapor is sufficient to practically eliminate the formation of free halogen in waste gases from the process. Any and all quantities of the second portion of water vapor which produce this result under other process conditions are intended to be within the scope of this invention.

What is claimed is:

1. In an improved process for the production of a finely divided oxide of Ti, Al, Fe, Zr, Si or mixtures thereof by the hydrolytic conversion of a corresponding volatile halide of Ti, Al, Fe, Zr, Si or mixtures thereof in a flame, said volatile halide being selected from the group consisting of chlorides, fluorides, bromides and iodides, wherein said volatile halide in a mixture with a combustible hydrogen-containing gas and air or oxygen are fed to a burner provided with a mouth emitting a flame, said mixture being burned in a fire tube to form a waste gas and a first portion of water vapor which will at least suffice for the hydrolysis of the volatile halide, said burner surrounded by an annular chamber forming a nozzle through which hydrogen is passed to keep the mouth of the burner free of attachments of solid substances, sufficient quantities of oxygen or air and combustible gas being introduced for the oxygen content of the mixture to be adequate to burn the combustible gas and to produce said first portion of water vapor in the course thereof, and wherein the resulting oxides are separated from other reaction products, the improvement wherein said flame is surrounded by a jacket of gases containing a second portion of water vapor in order to avoid the formation of halogen gas in waste gases.

2. Process of claim 1 in which said halide is a chloride.

3. Process of claim 1 in which the flame is surrounded by a jacket of gases containing superheated steam.

4. Process of claim 3 in which the second portion of water vapor is produced by burning additional hydrogen with secondary air.

5. Process of claim 4 in which the fire tube is provided with an opening spaced apart from the mouth of the burner, and the second portion of water vapor produced from superheated steam or produced by burning additional hydrogen is added to the process within the space.

6. Process of claim 4 in which the second portion of water vapor or additional hydrogen is added to the fire tube.

7. Process of claim 6 in which the second portion of water vapor produced from superheated steam or produced by burning the additional hydrogen is fed to the process by means of nozzles disposed in the upper part of the fire tube.

8. Process of claim 5 in which the additional hydrogen is added via the annular chamber.

9. Process of claim 5 in which the fire tube is constricted at its upper end to control the quantity of secondary air.

10. Process of claim 1 in which the flame has a temperature regulated by addition of an inert gas to the mixture consisting of the volatile halide, combustible gas and air or oxygen.

11. Process of claim 10 in which the inert gas is nitrogen.

12. Process of claim 7 in which the fire tube is provided with a ring with nozzles or an annular gap.

* * * * *